United States Patent Office 3,439,622
Patented Apr. 22, 1969

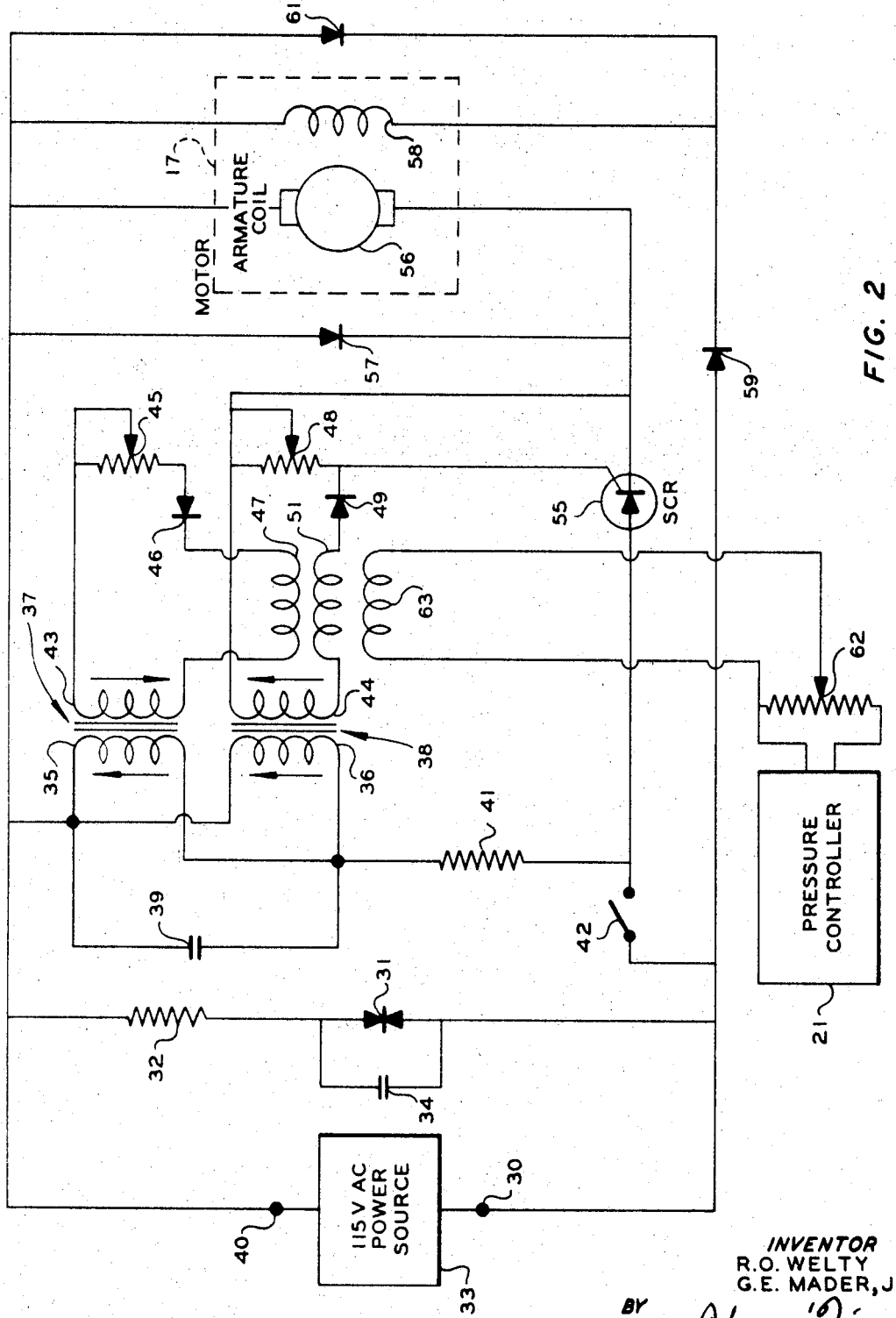

3,439,622
MOTOR CONTROL CIRCUIT UTILIZING A VOLTAGE CONTROLLED RECTIFIER
Richard O. Welty, Bartlesville, and George E. Mader, Jr., Dewey, Okla., assignors to Phillips Petroleum Company, a corporation of Delaware
Filed Sept. 2, 1966, Ser. No. 577,061
Int. Cl. F04b 49/06; F04d 15/00; H02p 5/00
U.S. Cl. 103—35          6 Claims

ABSTRACT OF THE DISCLOSURE

A rectifier is connected in the field circuit of a D.C. motor while a silicon controlled rectifier (SCR) is connected in the armature circuit of the motor. The primary coil of a step-down transformer is connected to a power supply while the secondary circuit contains a control coil, a rectifier and a variable resistor. This variable resistor is also connected between the cathode and gate terminal of the SCR. A control signal representative of the desired motor speed is applied to a coil which is magnetically coupled to the control coil. A biasing coil, together with a rectifier and a variable resistor, is connected in the secondary circuit of a second step-down transformer, the biasing coil being magnetically coupled to the control coil. The motor can be utilized to drive a variable speed pump in a melt index analyzer.

---

Figure 1:
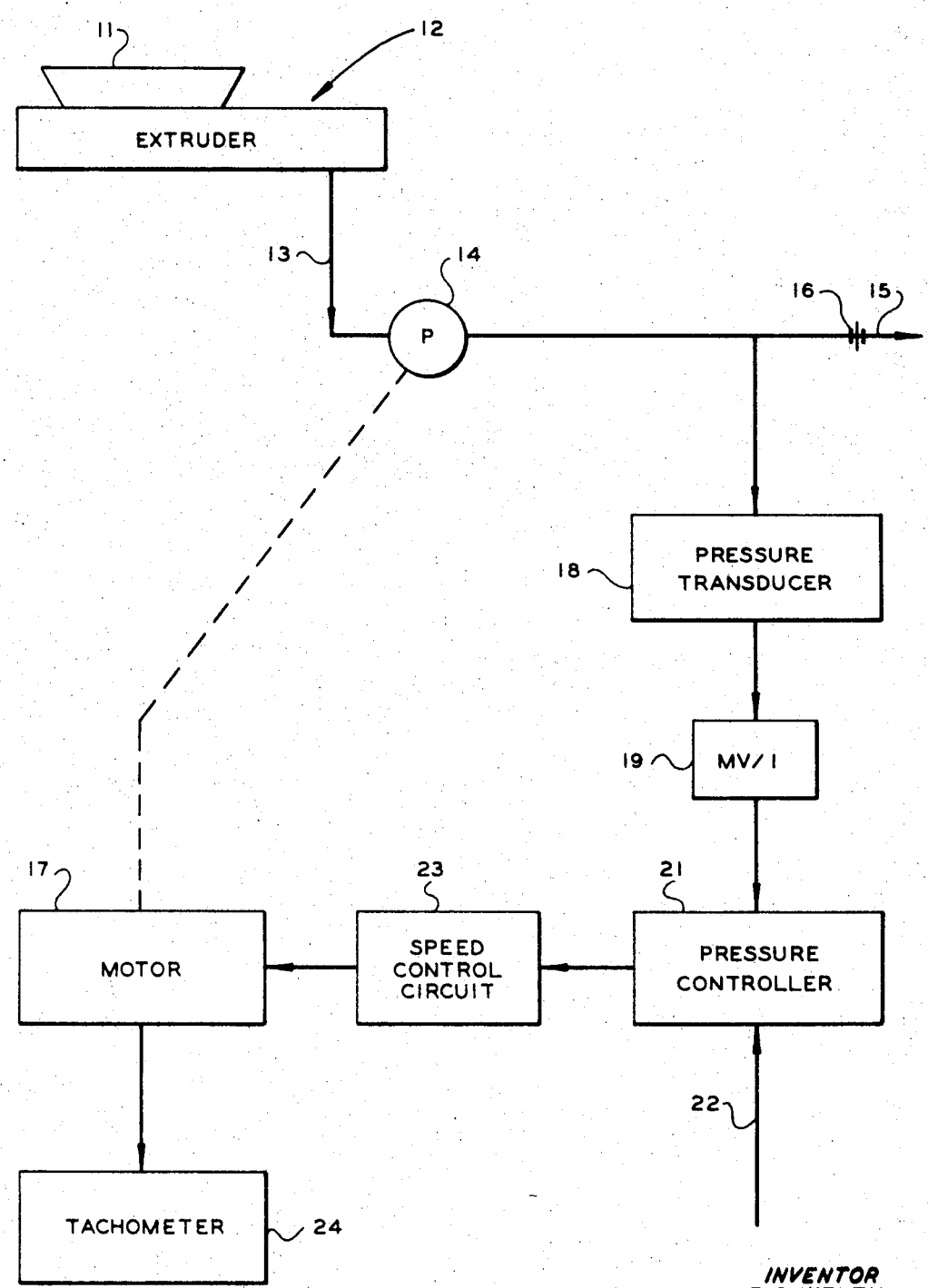

This invention relates to an improved motor control circuit. In a specific aspect the invention relates to an improved motor speed control circuit for a melt viscosity analyzer.

In a melt index analyzer of the type disclosed in FIGURE 2 of C. G. De Haven, U.S. Patent 3,048,030, issued Aug. 7, 1962, a control circuit is utilized to vary the speed of the motor responsive to the output of a pressure controller in order to maintain the pressure of the polymeric material substantially constant. In one such control circuit which has been utilized with melt index analyzers, a variable fraction of a reference voltage was compared with the back EMF (electromotive force) of the motor and the comparison (difference) signal was utilized to trigger a silicon controlled rectifier (SCR) to vary the current flow through the armature of the motor. It was necessary to utilize an electrical current to pneumatic pressure converter to apply the controller output to a pneumatic positioner which mechanically adjusted a potentiometer to determine the fraction of the reference voltage utilized in the comparison. This system is subject to signal losses and lags in the pneumatic and mechanical components, and the system is both complicated and expensive.

It has been discovered that the disadvantages of the prior system can be avoided by utilizing a step down transformer to provide a low voltage secondary circuit to supply the gating voltage to the SCR and magnetically coupling the electrical output of the controller to the low voltage secondary circuit to thereby modulate the gating voltage.

Accordingly it is an object of the invention to provide an improved motor control circuit. Another object of the invention is to provide a simpler and less expensive speed control means. Another object of the invention is to provide an improved melt index analyzer.

Other aspects, objects and advantages of the invention will be apparent from a study of the disclosure, the drawing and the appended claims to the invention.

In the drawings FIGURE 1 is a diagrammatic representation of a melt index analyzer embodying the invention and FIGURE 2 is a schematic representation of a speed control circuit in accordance with a presently preferred embodiment of the invention.

Referring now to the drawings in general and to FIGURE 1 in particular, a polymeric material, for example a normally solid polymer of a 1-olefiin, such as ethylene polymer, is introduced into hopper 11 and passes into extruder 12 wherein it is masticated and thoroughly mixed. Molten polymer leaves the extruder 12 by way of conduit 13 and is passed to the suction inlet of gear pump 14. Conduit 15 containing a restricted orifice 16 is connected to the discharge outlet of pump 14. Pump 14 is driven by variable speed motor 17 to maintain a predetermined, constant pressure in conduit 15 upstream of orifice 16. The flowing molten polymer produces a pressure in conduit 15 upstream of orifice 16 which is proportional to the flow rate of the polymer. This pressure is sensed by a suitable pressure transducer 18, for example a strain gage pressure transducer such as the Pressure Pickup Type 4–316 manufactured by Consolidated Electrodynamics Co. Transducer 18 produces a voltage output in the millivolt range, which is converted to a current signal by millivolt to current (mv./I) transducer 19. The resulting current signal is applied to an input of a suitable controller 21, such as the Minneapolis-Honeywell Electrical Tel-O-Set transistorized controller with proportional and reset modes. The input signal is compared with a set point value 22 representative of the pressure which is to be maintained in conduit 15 upstream of orifice 16. An electrical signal, representative of the difference between the compared signals, is applied to an input of speed control circuit 23. Circuit 23 controls the speed of motor 17, which can be any suitable variable speed motor, for example the Model 430, ¼ horsepower, 115 volts, 60 cycles, speed control motor drive manufactured by ACF Industries, Inc.

When the melt index of the flowing polymer varies, circuit 23 varies the speed of motor 17, and thus of pump 14, responsive to the variations in the output of transducer 18 to maintain a constant pressure upstream of orifice 16. Variations in the speed of motor 17 are indicated by a tachometer 24.

Referring now to FIGURE 2, a pair of diodes are connected cathode-to-cathode and in series with resistor 32 between the terminals of 115 volts alternating current power source 33. Capacitor 34 is connected between the anodes of the pair of diodes 31. Diodes 31, capacitor 34 and resistor 32 form a transient suppressor to minimize the effect of line voltage surges from source 33. Primary coils 35 and 36 of transformers 37 and 38, respectively, are connected in parallel with capacitor 39 between the first terminal 40 of source 33 and the first terminal of resistor 41. Switch 42 is connected between the second terminal 30 of source 33 and the second terminal of resistor 41. Switch 42 is manually operated to turn the speed control current on or off. Potentiometer 45 is connected between the first terminal of secondary coil 43 and the anode of rectifier 46, while the cathode of rectifier 46 is connected through coil 47 to the second terminal of coil 43. One terminal of potentiometer 45 is connected to the contactor thereof to thus permit the varying of the effective resistance in the secondary circuit of transformer 37. Potentiometer 48 is connected between the first terminal of secondary coil 44 and the cathode of rectifier 49, while the anode of rectifier 49 is connected through coil 51 to the second terminal of secondary coil 44. One terminal of potentiometer 48 is connected to the contactor thereof to permit the varying of the effective resistance in the secondary circuit of transformer 38. The secondary coil 43 of transformer 37 is positioned in an opposite direction to that of the secondary coil 44 of transformer 38, such that while the flow of electron current in primary coils 35 and 36 is in the same direction as indicated by the arrows for one half cycle of the alternating voltage from source 33, the flow of electron current in secondary coils 43 and 44 is in an opposite direction as indicated by the arrows for the same half cycle. During the other half cycle of the alternating voltage of source 33 the flow of current in primary coils 35 and 36 is opposite to that indicated by the arrows. However, there is no current flow in secondary coils 43 and 44 during the other half cycle as rectifiers 46 and 49 prevent the flow of current in the secondary circuit in a direction opposite to the arrows.

The first end terminal and contactor of potentiometer 48 are connected to the cathode of a voltage controlled rectifier 55, for example a silicon controlled rectifier (SCR), while the second end terminal of potentiometer 48 is connected to the gate of SCR 55. The anode of SCR 55 is connected to the junction between switch 42 and the second terminal of resistor 41. Armature coil 56 of motor 17 is connected between the cathode of SCR 55 and the first terminal 40 of power source 33. A rectifier 57 is connected in parallel with coil 56, with the cathode of rectifier 57 being connected to the cathode of SCR 55, to protect coil 56 against any voltage surges. Field winding 58 of motor 17 and rectifier 59 are connected in series between first terminal 40 and second terminal 30 of source 33 to provide a half wave rectified direct current through coil 58. Rectifier 61 is connected in parallel with coil 58 in back-to-back relationship with rectifier 59 to protect coil 58 against voltage surges.

The field winding 58 is energized by the uniform half wave rectified direct current voltage produced by source 33 and rectifier 59, and the armature coil 56 is energized by the variable half wave rectified direct current voltage produced by source 33 and SCR 55. SCR 55 varies the direct current through armature coil 56 by varying the portion of the half cycle which is passed by SCR 55. The portion of the half cycle passed is determined by the time of occurrence during the first half of the half cycle of a voltage equal to or greater than the triggering voltage being applied to the gate of SCR 55. The triggering or threshold voltage for the SCR 55 is generally a value in the range of 1 to 3 volts. In the illustrated circuit transformer 36, in the absence of other factors, can produce a voltage across the non-shorted portion of potentiometer 48 which will trigger SCR 55 to conduct during substantially the entire half cycle. However, coil 47 in the secondary circuit of transformer 37 is positioned in bucking relationship to the coil 51 in the secondary circuit of transformer 38. Coil 47 thus provides a bias voltage to effectively offset the zero position of the time required for the voltage of the secondary circuit of transformer 44 to reach the triggering value. The electrical output of pressure controller 21 is applied across the terminals of potentiometer 62. Coil 63 is connected between the contactor and one end terminal of potentiometer 62. Coil 63 is magnetically coupled to coil 51 in a bucking relationship, that is, in opposition to coil 51. Thus the electrical output signal from controller 21 modulates the voltage across potentiometer 48 to vary the fraction of the half cycle during which SCRC 55 conducts. This results in a variation in the effective current passed through armature coil 56 and thus controls the speed of motor 17 and pump 14.

While the invention has been illustrated in terms of the specific circuit of FIGURE 2, it is readily apparent that the various components can be connected in other arrangements. For example, the elements in series can be connected in any desired order. Motor 17 can be connected to operate on the opposite polarity half cycle. The rectifiers in the secondary circuits of transformers 37 and 38 can be poled in the opposite directions. Coil 51 can be connected to provide a voltage which would maintain SCR 55 in a nonconducting state except when overcome by the modulation of coil 63. Full wave rectification can be provided for the armature winding circuit and the field winding circuit instead of the half wave rectification illustrated.

What is claimed is:

1. Apparatus comprising a first transformer (38) having a primary coil (36) and a secondary coil (44);
 a third coil (51), a first rectifier (49) and a variable resistance (48) connected in series across said secondary coil (44);
 a source of alternating current power (33) connected across said primary coil (36);
 a direct current motor (17) having an armature winding (56) and a field winding (58);
 a voltage controlled rectifier (55) having an anode, a cathode and a gating terminal;
 means connecting said variable resistance (48) between the cathode and gating terminal of said voltage controlled rectifier (55);
 means connecting said voltage controlled rectifier (55) and said armature winding (56) in series between the terminals (30, 40) of said source of alternating current power (33);
 a third rectifier (59);
 means connecting said third rectifier (59) and said field winding (58) in series across the terminals (30, 40) of said source of alternating current power (33);
 a fourth coil (63) magnetically coupled to said third coil (51) in a bucking relationship;
 means (21) for applying a control voltage across said fourth coil (63) to modulate the voltage applied between the cathode and gating terminal of said voltage controlled rectifier (55) to regulate the amount of current passing through said armature winding (56) to thus control the speed of said motor;
 a second transformer (37) having a primary coil (35) and a secondary coil (43);
 means connecting said primary winding (35) of said second transformer (37) across the terminals of said source (33) of alternating current power;
 a second variable resistance (45), a fourth rectifier (46) and a seventh coil (47) connected in series across said secondary coil (43) of said second transformer (37);
 said seventh coil (47) being magnetically coupled to said third coil (51) in a bucking relationship.

2. Apparatus in accordance with claim 1 wherein said primary coil (36) of said first transformer (38) and said primary coil (35) of said second transformer (37) are connected in parallel, and said secondary coil (44) of said first transformer (38) and said secondary coil (43) of said second transformer (37) are connected to produce current flows in opposite directions in said third coil (51) and said seventh coil (47), respectively.

3. Apparatus comprising a first transformer (38) having a primary coil (36) and a secondary coil (44);
 a third coil (51), a first rectifier (49) and a variable resistance (48) connected in series across said secondary coil (44);
 a source of laternating current power (33) connected across said primary coil (36);
 a direct current motor (17) having an armature winding (56) and a field winding (58);
 a voltage controlled rectifier (55) having an anode, a cathode and a gating terminal;
 means connecting said variable resistance (48) between the cathode and gating terminal of said voltage controlled rectifier (55);
 means connecting said voltage controlled rectifier (55) and said armature winding (56) in series between the terminals (30, 40) of said source of alternating current power (33);
 a third rectifier (59);
 means connecting said third rectifier (59) and said field winding (58) in series across the terminals (30, 40) of said source of alternating current power (33);
 a fourth coil (63) magnetically coupled to said third coil (51) in a bucking relationship;
 means, comprising a pressure controller (21) having a signal input, a setpoint input and an electrical output, for applying a control voltage across said fourth coil (63) to modulate the voltage applied between the cathode and gating terminal of said voltage controlled rectifier (55) to regulate the amount of current passing through said armature winding (56) to thus control the speed of said motor;

an extruder (12);

a pump (14) driven by said motor (17);

first conduit means (13) communicating between an outlet of said extruder (12) and an inlet of said pump (14);

second conduit means (15) connected to an outlet of said pump and containing a restricted orifice (16);

means (18) connected to said second conduit means (15) upstream of said orifice (16) for producing a signal representative of the pressure in said second conduit means (15) upstream of said orifice (16);

means (19) for applying the output of said means for producing (18) to said signal input of said pressure controller.

4. Apparatus in accordance with claim 3 wherein said voltage controlled rectifier (55) is a silicon controlled rectifier.

5. Apparatus in accordance with claim 4 wherein said means for producing (18) is a strain gage pressure transducer.

6. Apparatus in accordance with claim 5 wherein said controller (21) is an electric controller.

References Cited

UNITED STATES PATENTS

| | | | |
|---|---|---|---|
| 3,048,030 | 8/1962 | De Haven | 73—56 |
| 3,222,586 | 12/1965 | Fontenote et al. | 318—331 |
| 3,269,320 | 8/1966 | Tilley et al. | 103—25 |
| 3,284,669 | 11/1966 | Boyd | 103—25 |
| 3,334,285 | 8/1967 | Blake | 103—35 |
| 3,336,517 | 8/1967 | Cain | 318—345 |
| 3,343,055 | 9/1967 | Havlicek et al. | 318—345 |

WILLIAM L. FREEH, *Primary Examiner.*

U.S. Cl. X.R.

318—308, 345